US012066563B2

(12) United States Patent
Ito et al.

(10) Patent No.: US 12,066,563 B2
(45) Date of Patent: Aug. 20, 2024

(54) VEHICULAR LAMP FITTING, RADAR-COVER REMOVING METHOD, AND RADAR-COVER ATTACHING METHOD

(71) Applicants: Stanley Electric Co., Ltd., Tokyo (JP); Honda Motor Co., Ltd., Tokyo (JP)

(72) Inventors: Satoshi Ito, Tokyo (JP); Yuri Mitomo, Tokyo (JP); Takuya Matsumaru, London, OH (US); Kentaro Mori, Tokyo (JP); Miho Sasaki, Wako (JP); Hideaki Aizawa, Tokyo (JP); Masayuki Takayama, Wako (JP); Hironori Tamakawa, Tokyo (JP); Takato Watanabe, Tokyo (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 17/516,738

(22) Filed: Nov. 2, 2021

(65) Prior Publication Data

US 2023/0138416 A1 May 4, 2023

(51) Int. Cl.
*G01S 7/02* (2006.01)
*F21S 41/20* (2018.01)
*F21S 41/29* (2018.01)
*G01S 13/931* (2020.01)

(52) U.S. Cl.
CPC ............... *G01S 7/028* (2021.05); *F21S 41/28* (2018.01); *F21S 41/29* (2018.01); *G01S 13/931* (2013.01); *G01S 2013/93277* (2020.01)

(58) Field of Classification Search
CPC .................. G01S 7/028; G01S 13/931; G01S 2013/93277; F21S 41/28; F21S 41/29
USPC ........................................................... 342/52
See application file for complete search history.

(56) References Cited

U.S. PATENT DOCUMENTS

| 8,432,309 | B2 * | 4/2013 | MacDonald | G01S 13/931 342/123 |
| 9,400,328 | B2 * | 7/2016 | Hsiao | G01S 13/87 |
| 10,012,720 | B2 * | 7/2018 | Emanuelsson | H01Q 1/528 |
| 10,048,369 | B2 * | 8/2018 | Aoki | G01S 7/032 |
| 11,858,410 | B2 * | 1/2024 | Maruyama | B60Q 1/0023 |
| 2009/0219191 | A1 * | 9/2009 | Natsume | B60Q 1/0023 342/109 |

(Continued)

FOREIGN PATENT DOCUMENTS

| EP | 2141048 A1 * | 1/2010 | ........... B60Q 1/0023 |
| EP | 2141048 B1 * | 3/2011 | ........... B60Q 1/0023 |
| JP | 2020-38181 A | 3/2020 | |

*Primary Examiner* — Nuzhat Pervin
(74) *Attorney, Agent, or Firm* — XSENSUS LLP (57) ABSTRACT

A vehicular lamp fitting and the like capable of preventing the distance between a radar unit and the radar cover from changing are provided. A vehicular lamp fitting includes: a lamp housing; an outer lens attached to the lamp housing while covering an opening of the lamp housing, and forming a first space between the outer lens and the lamp housing; a lamp unit disposed in the first space; a radar housing; a radar cover attached to the radar housing while covering an opening of the radar housing, and forming a second space between the radar cover and the radar housing; a radar unit disposed in the second space; a first fixing part fixing the radar unit to the radar housing; and a second fixing part fixing the radar cover to the radar housing.

16 Claims, 10 Drawing Sheets

(56) References Cited

U.S. PATENT DOCUMENTS

| | | | |
|---|---|---|---|
| 2018/0090832 A1* | 3/2018 | Takahashi | G01S 13/931 |
| 2020/0101889 A1* | 4/2020 | Iwai | G01S 13/931 |
| 2020/0386381 A1* | 12/2020 | Aizawa | F21S 43/50 |
| 2022/0134939 A1* | 5/2022 | Maruyama | G01S 7/027 |
| | | | 342/175 |
| 2022/0404489 A1* | 12/2022 | Kikuchi | H01Q 1/42 |

* cited by examiner

VEHICULAR LAMP FITTING, RADAR-COVER REMOVING METHOD, AND RADAR-COVER ATTACHING METHOD

BACKGROUND

The present disclosure relates to a vehicular lamp fitting, a method for removing a radar cover, and a method for attaching a radar cover. In particular, the present disclosure relates to a vehicular lamp fitting, a method for removing a radar cover, and a method for attaching a radar cover, capable of preventing the distance between a radar unit and the radar cover from changing (and as a result, preventing noises from occurring in electromagnetic waves (radar signals) that pass through the radar cover and are transmitted to an area around the vehicle).

Japanese Unexamined Patent Application Publication No. 2020-38181 discloses a vehicular lamp fitting including a lamp housing, a radar unit (a radar apparatus) attached to a plate-like part extending downward from the lower part of the lamp housing, and a radar cover disposed in front of the radar unit (see, in particular, FIG. 2 of Japanese Unexamined Patent Application Publication No. 2020-38181). The radar unit is used for detecting an object by transmitting a high-frequency electromagnetic wave (e.g., millimeter wave) around a vehicle and receiving a reflected wave from the object existing within a transmission range of the electromagnetic wave.

SUMMARY

However, in the vehicular lamp fitting disclosed in Japanese Unexamined Patent Application Publication No. 2020-38181, the radar unit and the radar cover are fixed to respective components different from each other. Therefore, the radar unit and the radar cover vibrate in different manners from each other due to vibrations of the vehicle on which the vehicular lamp fitting is mounted (e.g., due to vibrations thereof during the traveling), so that the distance between the radar unit and the radar cover changes one after another. Consequently, electromagnetic waves transmitted by the radar unit (traveling waves) and electromagnetic waves reflected by the radar cover (reflected waves) interfere with each other. As a result, when the traveling wave and the reflected wave interfere with each other, the following problem occurs. That is, the transmission power increases or decreases according to the phase states of these waves, so that they become an electromagnetic wave like one in which an amplitude modulation is superimposed on the traveling wave, and noises occur in electromagnetic waves (radar signals) that pass though the radar cover and are transmitted to an area around the vehicle.

The present disclosure has been made in order to solve the above-described problem, and an object thereof is to provide a vehicular lamp fitting, a method for removing a radar cover, and a method for attaching a radar cover, capable of preventing the distance between a radar unit and the radar cover from changing (and as a result, preventing noises from occurring in electromagnetic waves (radar signals) that pass through the radar cover and are transmitted to an area around the vehicle).

A vehicular lamp fitting according to an aspect includes: a lamp housing; an outer lens attached to the lamp housing in a state covering an opening of the lamp housing and forming a first space between the outer lens and the lamp housing; a lamp unit disposed in the first space; a radar housing; a radar cover attached to the radar housing in a state covering an opening of the radar housing, and forming a second space between the radar cover and the radar housing; a radar unit disposed in the second space; a first fixing part fixing detachably the radar unit to the radar housing; and a second fixing part fixing detachably the radar cover to the radar housing.

By the above-described configuration, it is possible to prevent the distance between the radar unit and the radar cover from changing (and as a result, to prevent noises from occurring in electromagnetic waves (radar signals) that pass through the radar cover and are transmitted to an area around the vehicle).

This is because the radar unit and radar cover are fixed to one and the same radar housing. That is, this is because since the radar unit and the radar cover are fixed to the same radar housing, the radar unit and the radar cover vibrate similarly by vibration (For example, vibration during driving) of a vehicle on which the vehicular lamp fitting is mounted, and as a result, the distance between the radar unit and the radar cover does not change.

Further, there is another advantage that the effect of the heat (the heat generated by the lamp unit) on the radar unit can be reduced. This is because the radar unit is disposed in the second space (formed by the radar housing and the radar cover) in which the temperature is lower than that in the first space (formed by the lamp housing and the outer lens) where the temperature is raised due to the heat generated by the lamp unit.

Further, there is an advantage that maintenance can be easily performed when the radar unit fails. This is because, since the radar unit and the radar cover are detachably fixed, the radar unit can be replaced by removing the radar cover from the radar housing without removing the vehicular lamp fitting itself from the vehicle.

Further, in the above-described vehicular lamp fitting, in the lamp housing and the radar housing, an opening of the lamp housing and an opening of the radar housing adjacent to each other may be connected to each other by a connecting part.

Further, in the above-described vehicular lamp fitting, a side surface of the lamp housing and a side surface of the radar housing may be opposed to each other with a space therebetween.

In this way, the effect of the heat (the heat generated by the lamp unit) on the radar unit can be further reduced.

Further, in the above-described vehicular lamp fitting, the lamp housing, the radar housing, and the connecting part may be formed as an integrated component by injection molding.

As a result, the radar housing can be arranged with high accuracy with respect to the lamp housing as compared with the case where the lamp housing and the radar housing are individually molded and the both are combined as an assembly. Therefore, it is possible to suppress the variation of the detection areas of the radar unit.

Further, in the above-described vehicular lamp fitting, the outer lens may be welded to the opening of the lamp housing and the connecting part.

Further, in the above-described vehicular lamp fitting, the radar housing may be disposed below the lamp housing.

Further, in the above-described vehicular lamp fitting, the first fixing part may be provided in the radar housing.

Further, the above-described vehicular lamp fitting may further include a bracket fixed to the radar housing, and the first fixing part may be provided in the bracket.

In this way, radar units having various shapes can be fixed to the radar housing by replacing the bracket by other brackets without changing the shape of the radar housing.

Further, in the above-described vehicular lamp fitting, an end of the outer lens and an end of the radar cover may be opposed to each other. The end of the outer lens may include a first extension part extending beyond the connecting part to a radar cover side. Further, the end of the radar cover may include a second extension part extending from the end of the radar cover to an area behind the first extension part.

Further, in the above-described vehicular lamp fitting, the second extension part may extend in an arc shape around the connecting part.

In this way, even when the radar housing (and the radar cover and the radar unit fixed to the radar housing) shakes (or sways) around the connecting part, interference (e.g., a collision) between the ends of the outer lens and the radar cover, which are opposed to each other, can be prevented.

Further, in the above-described vehicular lamp fitting, the outer lens may be transparent to visible light, and the radar cover may be opaque to visible light.

Further, in the above-described vehicular lamp fitting, the vehicular lamp fitting may be mounted on a vehicle to which a bumper is attached, and the radar cover may be removed from the radar housing without causing the radar cover to interfere with the bumper by making the second extension part of the radar cover abut against the end of the outer lens and rotating the radar cover around a point at which the radar cover abuts against the end of the outer lens.

By the above-described configuration, when the radar cover is removed from the radar housing, the radar cover can be removed without causing the end of the radar cover to come into contact with the end of the bumper. Therefore, it is possible to prevent the bumper from being damaged due to the removal of the radar cover.

Further, in the above-described vehicular lamp fitting, the vehicular lamp fitting which can be mounted on a vehicle to which a bumper is attached, the radar cover may be attached to the radar housing without causing the radar cover to interfere with the bumper by making the second extension part of the radar cover abut against the end of the outer lens and rotating the radar cover around a point at which the radar cover abuts against the end of the outer lens.

By the above-described configuration, when the radar cover is attached to the radar housing, the radar cover can be removed without causing the edge of the radar cover to come into contact with the edge of the bumper. Therefore, it is possible to prevent the bumper from being damaged due to the attaching of the radar cover.

Further, in the above-described vehicular lamp fitting, an end of the radar cover and an end of the bumper that are opposed to each other may be formed in such a shape that a gap between these ends becomes wider toward a rear.

A method for removing a radar cover according to another aspect is a method for removing a radar cover from a radar housing in a vehicular lamp fitting, including: making a second extension part of the radar cover abut against an end of the outer lens; and rotating the radar cover around a point at which the second extension part of the radar cover abuts against the end of the outer lens, and thereby removing the radar cover from the radar housing without causing the radar cover to interfere with a bumper.

A method for attaching a radar cover according to another aspect is a method for attaching a radar cover to a radar housing in a vehicular lamp fitting, including: making a second extension part of the radar cover abut against an end of the outer lens; and rotating the radar cover around a point at which the second extension part of the radar cover abuts against the end of the outer lens, and thereby attaching the radar cover from the radar housing without causing the radar cover to interfere with a bumper.

According to the present disclosure, it is possible to provide a vehicular lamp fitting, a method for removing a radar cover, and a method for attaching a radar cover, capable of preventing the distance between a radar unit and the radar cover from changing (and as a result, preventing noises from occurring in electromagnetic waves (radar signals) that pass through the radar cover and are transmitted to an area around the vehicle).

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A vehicular lamp fitting 10, which is an embodiment according to the present disclosure, will be described hereinafter with reference to the attached drawings.

The same reference numerals (or symbols) are attached to corresponding components throughout the drawings, and redundant explanations thereof are omitted as appropriate.

Figure 1:
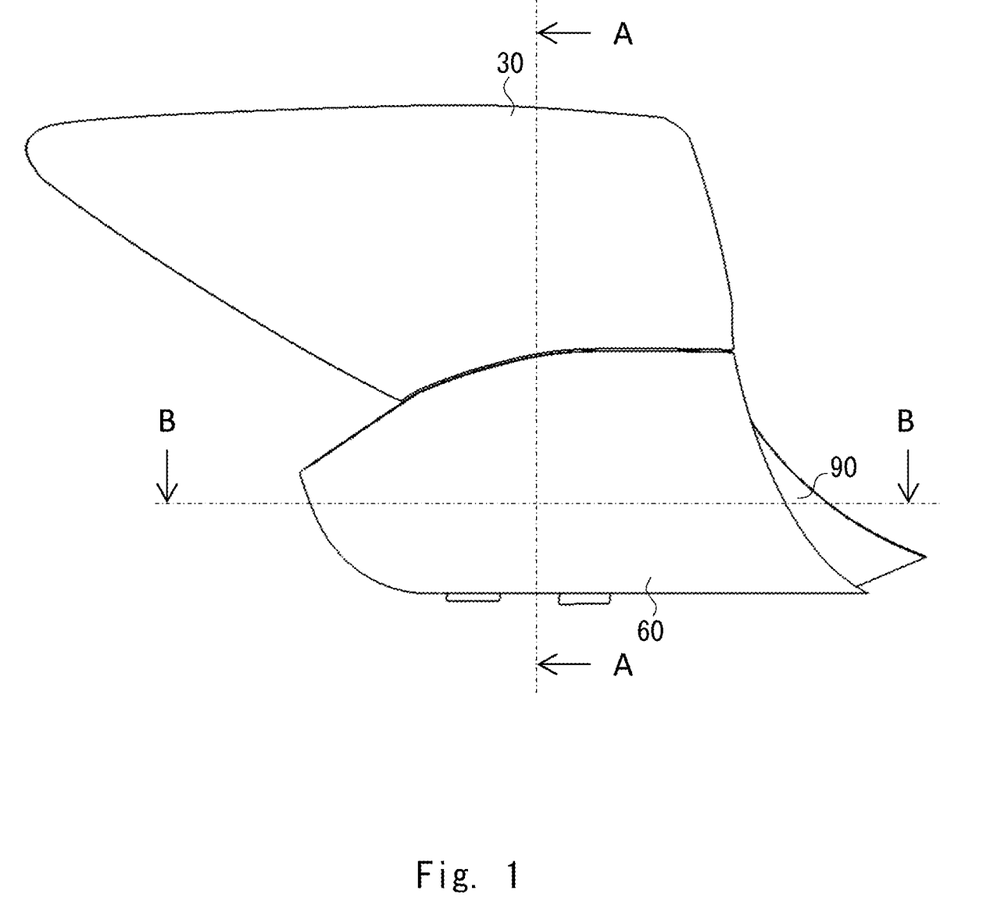
FIG. 1 is a front view of a vehicular lamp fitting 10.

FIG. 1 is a front view of the vehicular lamp fitting 10.

The vehicular lamp fitting 10 according to this embodiment is a signal lighting fixture for a vehicle (hereinafter also referred to as a vehicle signal lighting fixture) that functions as a rear combination lamp, and is mounted on each of the left and right sides of the rear end of a vehicle such as an automobile (not shown). Since the vehicular lamp fittings 10 mounted on both the left and right sides of the rear end of the vehicle are symmetrical to each other, only the vehicular lamp fitting 10 mounted on the left side (the left side when facing the front side of the vehicle) of the rear end of the vehicle will be described hereinafter as a representative example.

Figure 2:
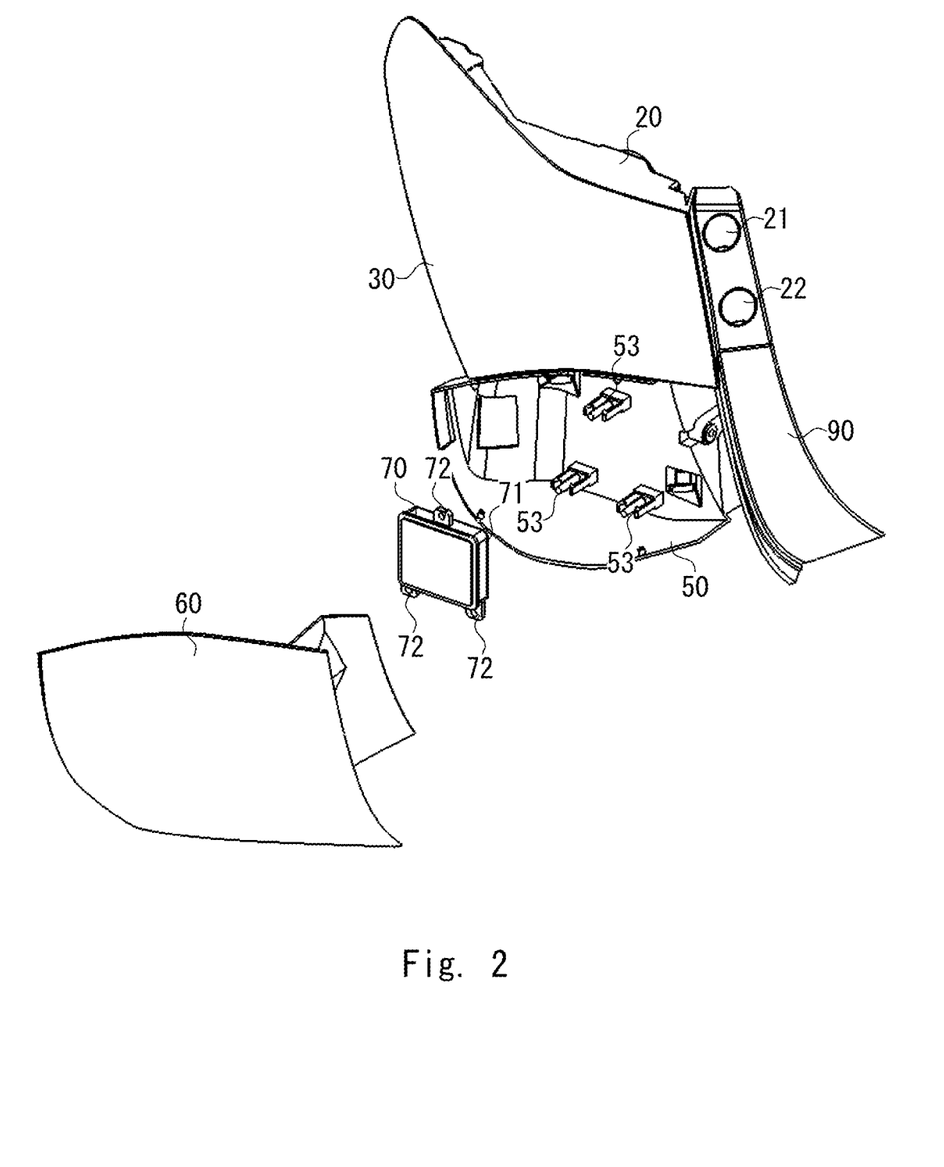
FIG. 2 is an exploded perspective view of the vehicular lamp fitting 10.
Figure 3:
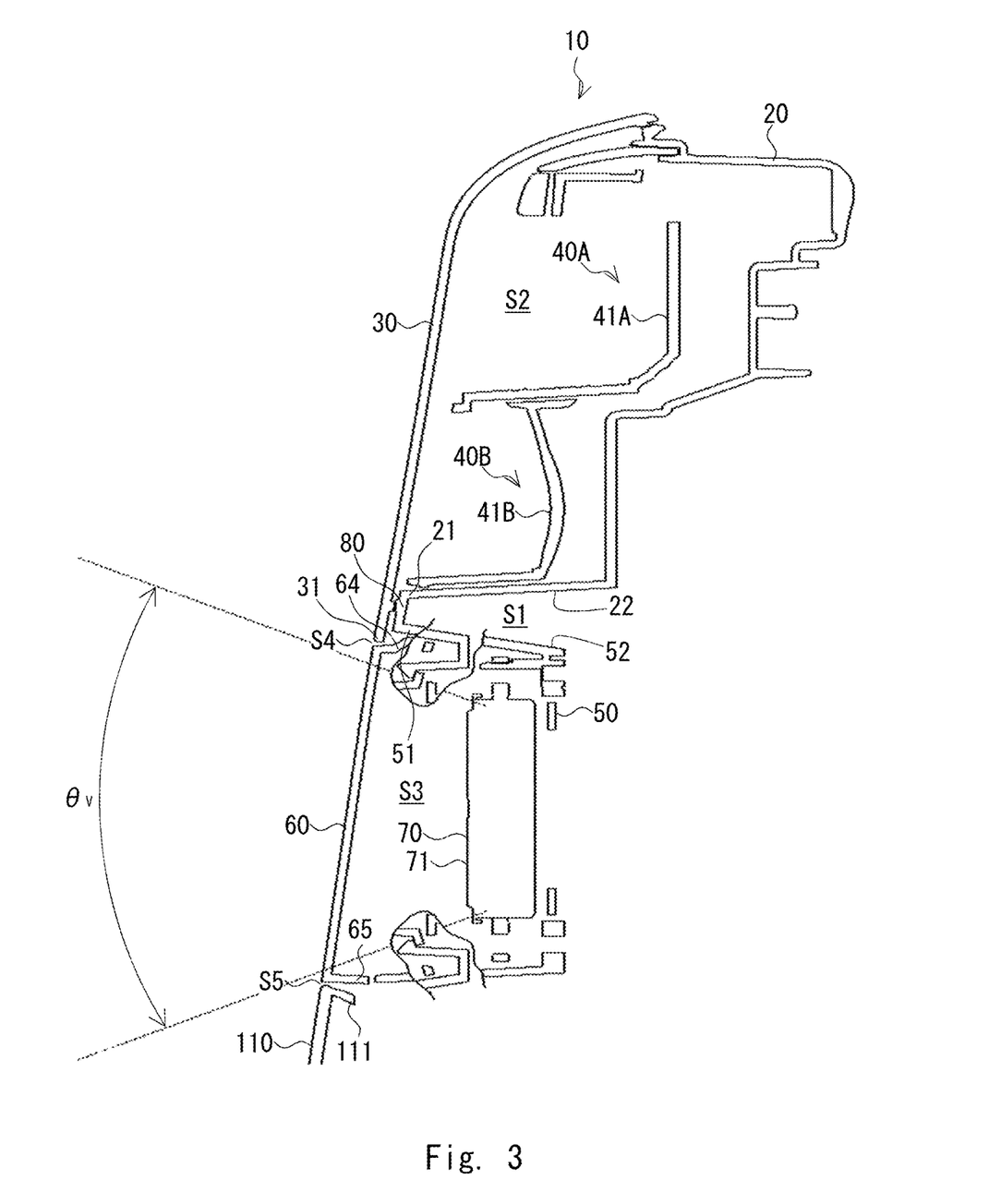
FIG. 3 is a cross-sectional view taken along a line A-A in FIG. 1.
Figure 4:
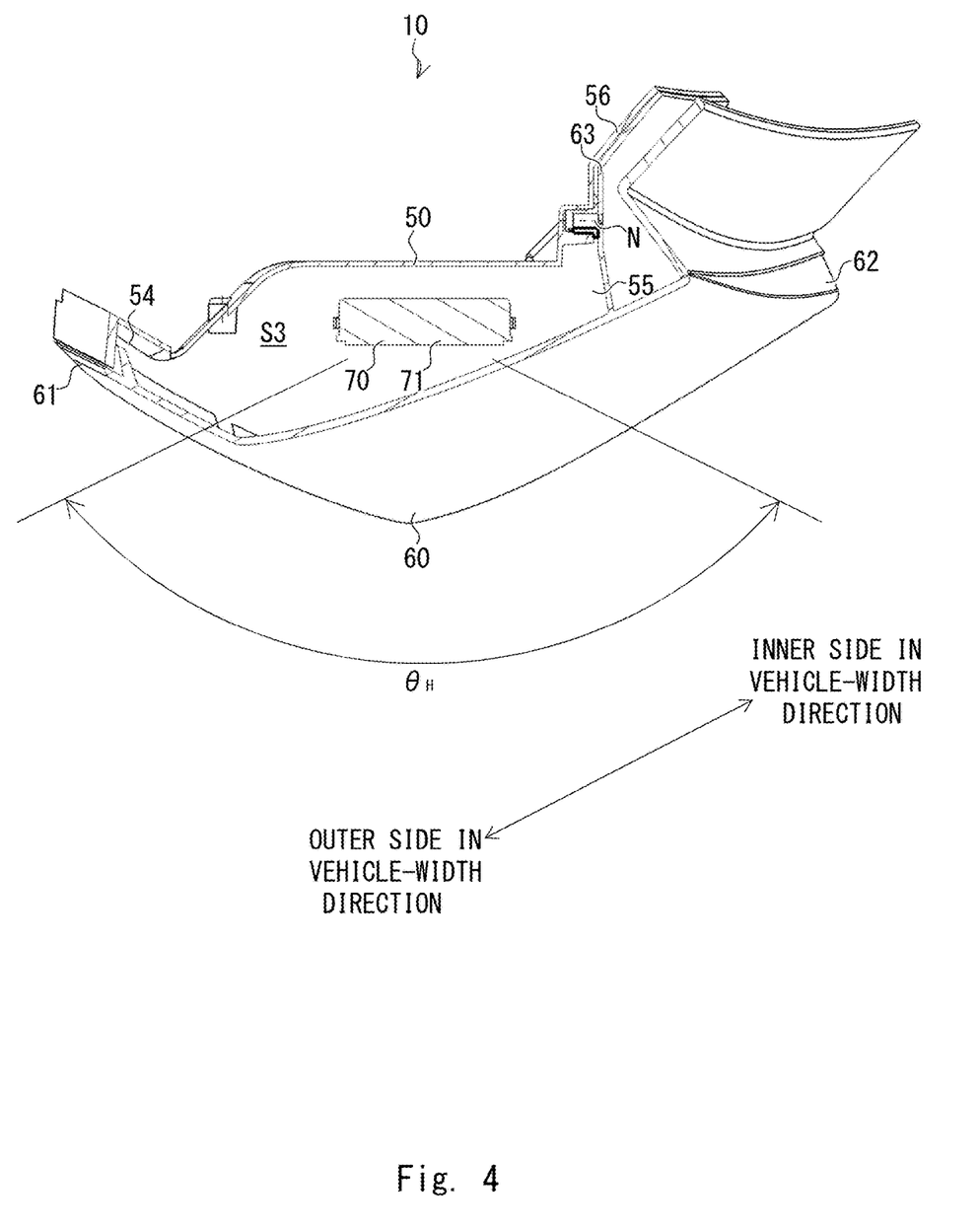
FIG. 4 is a cross-sectional view taken along a line B-B in FIG. 1.

FIG. 2 is an exploded perspective view of the vehicular lamp fitting 10. FIG. 3 is a cross-sectional view taken along a line A-A in FIG. 1. FIG. 4 is a cross-sectional view taken along a line B-B in FIG. 1.

As shown in FIG. 3, etc., the vehicular lamp fitting 10 includes a lamp housing 20, an outer lens 30, lamp units 40A and 40B, a radar housing 50, a radar cover 60, and a radar unit 70.

In the lamp housing 20 and the radar housing 50 disposed below the lamp housing 20, an opening 21 of the lamp housing 20 and an opening 51 of the radar housing 50 that are adjacent to each other are connected by a connecting part 80 (see FIG. 3). In this regard, a side surface 22 (a lower surface in FIG. 3) of the lamp housing 20 and a side surface 52 (an upper surface in FIG. 3) of the radar housing 50 are formed in such a manner that the gap between the side surface 22 of the lamp housing 20 and the side surface 52 of the radar housing 50 becomes wider (i.e., the distance therebetween increases) from the front toward the rear (from the left side toward the right side in FIG. 3). Further, the side surface 22 of the lamp housing 20 and the side surface 52 of the radar housing 50 are opposed to each other with a space therebetween S1 (i.e., with a space S1 interposed therebetween). Note that the side surface 22 of the lamp housing 20 and the side surface 52 of the radar housing 50 are formed in such a manner that the gap between them becomes wider toward the rear, so that the lamp housing 20 and the radar housing 50 are disposed as close as possible in the front (on the left side in FIG. 3) and the up/down width of the space S1 becomes as large as possible in the rear (on the right side in FIG. 3). However, in the case where the amount of heat in the lamp housing 20 is small, the side surface 22 of the lamp housing 20 and the side surface 52 of the radar housing 50 may be formed so that they are parallel to each other (roughly parallel to each other), or so that the gap (i.e., the distance) between them becomes narrower toward the rear.

The lamp housing 20, the radar housing 50, and the connecting part 80 are molded as an integrated component by injection-molding them from a synthetic resin such as acrylic and polycarbonate.

The outer lens 30 is made of a material transparent to light (visible light) emitted by the lamp units 40A and 40B, and, for example, made of a transparent resin (a synthetic resin) such as acrylic and polycarbonate. For example, the outer lens 30 is made of a red transparent resin. Note that the outer lens 30 may be made of a transparent resin having a color other than red. The outer lens 30 is attached to the lamp housing 20 in a state in which it covers the opening 21 of the lamp housing 20, and forms a space S2 (an example of the first space in the present disclosure) between the outer lens 30 and the lamp housing 20. The outer lens 30 is welded to the lamp housing 20 (to the peripheral edge of the opening and to the connecting part 80) along its whole peripheral edge. Note that the outer lens 30 may have an arbitrary shape as desired according to the design of the vehicle or the like.

The lamp units 40A and 40B are disposed in the space S2 formed by the outer lens 30 and the lamp housing 20 (see FIG. 3).

The lamp unit 40A is, for example, a lamp unit for a stop lamp, and includes a reflector 41A (a reflective surface) for the stop lamp and a light source for the stop lamp (illustration thereof is omitted in FIG. 3). When the light source for the stop lamp is turned on, light emitted from the light source for the stop lamp is reflected by the reflector 41A (the reflective surface) for the stop lamp, passes through the outer lens 30, and is emitted to the outside. In this way, the stop lamp is implemented.

The lamp unit 40B is, for example, a lamp unit for a turn lamp (e.g., a blinker), and includes a reflector 41B (a reflective surface) for the turn lamp and a light source for the turn lamp (illustration thereof is omitted in FIG. 3). When the light source for the turn lamp is turned on, light emitted from the light source for the turn lamp is reflected by the reflector 41B (the reflective surface) for the turn lamp, passes through the outer lens 30, and is emitted to the outside. In this way, the turn lamp is implemented.

The radar cover 60 is made of a material opaque to visible light, such as a black synthetic resin. Note that the color of the radar cover 60 is not limited to black. That is, the radar cover 60 may have any color as long as it is opaque to visible light. The radar cover 50 is provided to protect the radar unit 70 from stepping stones or the like and to improve the appearance. The radar cover 60 is attached to the radar housing 50 in a state in which it covers the opening 51 of the radar housing 50, and forms a space S3 (an example of the second space in the present disclosure) between the radar cover 60 and the radar housing 50. Note that it is sufficient if the radar cover 60 is large enough to cover the area through which electromagnetic waves transmitted from the radar unit 70 (millimeter waves having the angle of divergence θv in the vertical direction (hereinafter also referred to as the vertical divergence angle θv) (see FIG. 3) and the angle of divergence OH in the horizontal direction (hereinafter also referred to as the horizontal divergence angle θH) (see FIG. 3)) pass through, and may have an arbitrary shape as desired according to the design of the vehicle or the like as long as it satisfies the aforementioned condition.

The radar unit 70 (the radar apparatus) is disposed in the space S3 (an example of the second space in the present disclosure) formed by the radar cover 60 and the radar housing 50 (see FIG. 3). The radar unit 70 includes a case 71, a transmitting antenna and a receiving antenna (both of which are not shown) housed in the case 71, and so on. The radar unit 70 is a millimeter-wave radar unit that transmits electromagnetic waves (millimeter waves) from the transmitting antenna. The electromagnetic waves (the millimeter waves) pass through the radar cover 60 and are transmitted to a range having a vertical divergence angle $\theta_v$ (see FIG. 3) and a horizontal divergence angle $\theta_H$ (see FIG. 3). Further, the radar unit 70 receives, by the receiving antenna, reflected waves which have been reflected by an object present in the aforementioned transmission range and have passed through the radar cover 60. The received signal is processed by a control apparatus such as an ECU (Electronic Control Unit) (not shown), so that the object (e.g., a distance, an angle, and a velocity of the object) is detected. In the radar unit 70, for example, millimeter waves in a frequency band of 76 to 81 GHz, in particular, in a frequency band of 79 GHz, are used. However, the frequency band is not limited to these frequency bands.

Note that the radar method of the radar unit 70 may be either of a pulse method or a CW (Continuous Wave) method, or may be any other method. Further, the antenna method of the radar unit 70 may be any of a mechanical scanning method, a beam switching method, a phased array method, and a digital forming method, or may be any other method.

The radar unit 70 is detachably fixed to the radar housing 50. Specifically, as shown in FIG. 2, the radar unit 70 is detachably fixed to the radar housing 50 as engagement parts 53 (three places in FIG. 2) provided in the radar housing 50 engage with flange parts 72 (three places in FIG. 2) provided in the case 71. Each of the engagement parts 53 is, for example, a pair of claw parts (hook parts) that sandwiches a respective one of the flange parts 72 provided in the case 71 from both sides thereof, and the engagement parts 53 are disposed at places (three places in FIG. 2) corresponding to those of the flange parts 72 (three places in FIG. 2). The engagement parts 53 (the pairs of claw parts) are an example of the first fixing part in the present disclosure. Note that the radar unit 70 may be detachably fixed to the radar housing 50 by using, instead of using the engagement parts 53, known fixing means such as screws.

The radar cover 60 is detachably fixed to the radar housing 50. Specifically, as shown in FIG. 4, the radar cover 60 is detachably fixed to the radar housing 50 by inserting the end 61 of the radar cover 60 on the outer side in the vehicle-width direction into an opening formed at the end 54 of the radar housing 50 on the outer side in the vehicle-width direction, and fixing a flange part 63 provided at the end 62 of the radar cover 60 on the inner side in the vehicle-width direction to the end of the radar housing 50 on the inner side in the vehicle-width direction by a screw N. The screw N is an example of the second fixing part in the present disclosure.

As shown in FIG. 3, the end of the outer lens 30 (the lower end in FIG. 3) and the end of the radar cover 60 (the upper end in FIG. 3) are opposed to each other with a space therebetween S4 (i.e., with a space S4 interposed therebetween).

The end of the outer lens 30 (the lower end in FIG. 3) includes a first extension part 31 extending beyond the connecting part 80 to the radar cover 60 side.

Meanwhile, the end of the radar cover 60 (the upper end in FIG. 3) includes a second extension part 64 extending from the end of the radar cover 60 to an area behind the first extension part 31. The second extension part 64 extends in an arc shape around the connecting part 80 (e.g., the center thereof). By inserting the radar cover 60 (the second extension part 64) behind the outer lens 30 (the first extension part 31) as described above, it is possible to prevent the housings (the lamp housing 20, the radar housing 50, and the like) from being visible through the gap (the space S4) between the outer lens 30 and the radar cover 60.

As shown in FIG. 3, the radar cover 60 is disposed above and adjacent to a bumper 110 attached to the vehicle (not shown) across a gap S5 (i.e., with a gap S5 interposed therebetween). The end of the radar cover 60 (the lower end in FIG. 3) includes a third extension part 65 extending rearward from the end of the radar cover 60. The third extension part 65 extends rearward roughly in the horizontal direction. Note that the third extension part 65 may extend in a direction inclined from the horizontal direction (e.g., may extend diagonally upward).

The bumper 110 is disposed below and adjacent to the radar cover 60 across the gap S5 (i.e., with the gap S5 interposed therebetween). The end of the bumper 110 (the upper end in FIG. 3) includes a fourth extension part 111 extending rearward from the end of the bumper 110. The fourth extension part 111 extends in a direction inclined from the horizontal direction (e.g., extends diagonally downward).

The third and fourth extension parts 65 and 111 are formed in such a manner that they become wider (i.e., the distance therebetween increases) toward the rear. In this way, it is possible to prevent the end of the outer lens 30 (the lower end in FIG. 3) and the end of the radar cover 60 (the upper end in FIG. 3), which are opposed to each other, from interfering with (e.g., colliding against) each other even when the radar housing 50 (and the radar cover 60 and radar unit 70 fixed to the radar housing 50) shakes (or sways) around the connecting part 80.

Further, it is possible to prevent the end of the outer lens 30 (the lower end in FIG. 3) and the end of the radar cover 60 (the upper end in FIG. 3), which are opposed to each other, from interfering with each other even when the third extension part 65 at the lower end of the radar cover 60 and the fourth extension part 111 at the upper end of the bumper 110 shakes (or sways) around the connecting part 80 when the radar cover 60 is removed from the radar housing 50. The vehicular lamp fitting 10 having the above-described configuration is mounted on a vehicle by fixing flange parts 23 and 24 (see FIG. 5A) provided in the lamp housing 20 to the vehicle (e.g., the frame of the vehicle body or the bumper) by screws. Note that although it is not shown in the drawings, the radar housing 50 may also include flange parts similar to the flange parts 23 and 24, and these flange parts may be fixed to the vehicle (e.g., the frame of the vehicle body or the bumper) by screws.

Figure 5A:
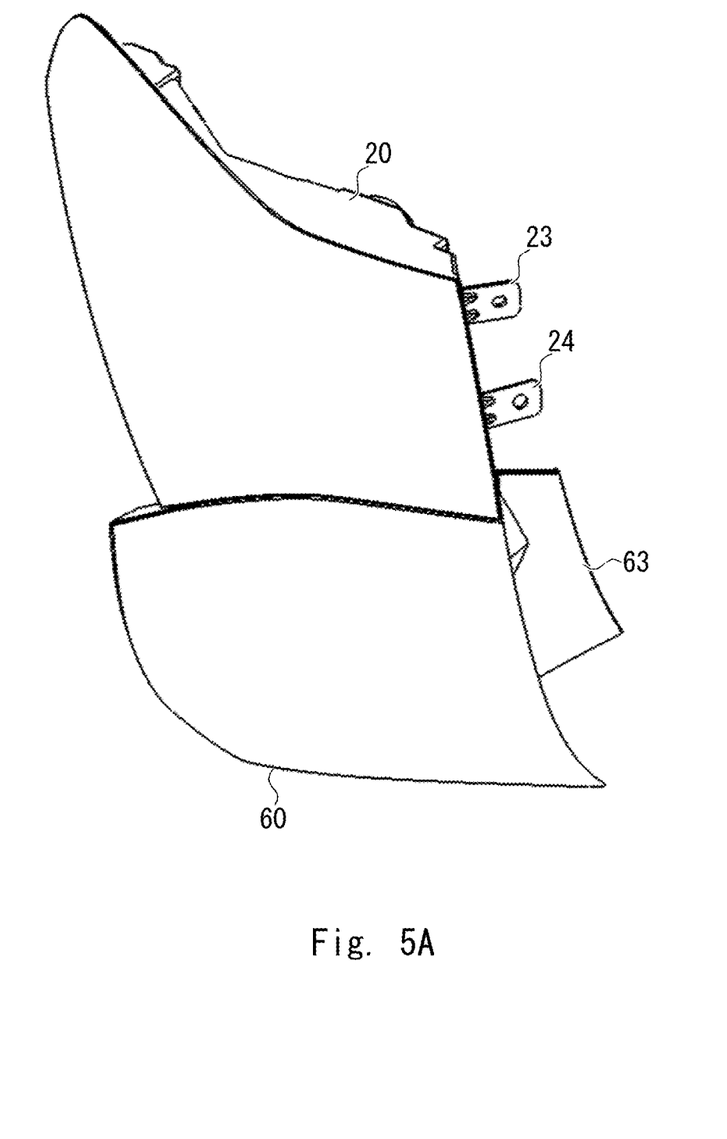
FIG. 5A shows a bezel 90 before it is attached.
Figure 5B:
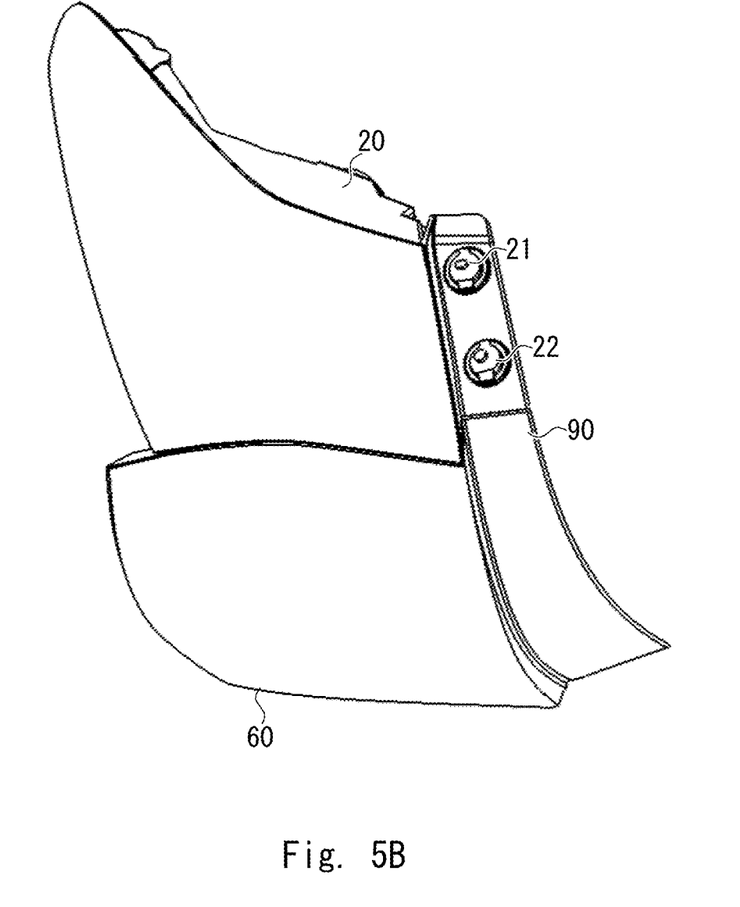
FIG. 5B shows the bezel 90 after it is attached.

As shown in FIG. 5B, the fastening parts (the flange parts 23 and 24, etc.) between the lamp housing 20 and the vehicle (e.g., the frame of the vehicle body or the bumper), which are fixed by screws as described above, and the fastening parts (the flange part 63, etc.) between the radar housing 50 and the radar cover 60, which are also fixed by screws as described above, are covered by a bezel 90. In this way, the appearance is improved. FIG. 5a shows the bezel 90 before it is attached, and FIG. 5b shows the bezel 90 after it is attached.

Next, a procedure for replacing the radar unit 70 will be described.

Firstly, the bezel 90 is removed. As a result, the screw N (see FIG. 4), which fastens the radar cover 60 to the radar housing 50, is exposed. Next, this screw N is removed, and the radar cover 60 is removed from the radar housing 50. As a result, the radar unit 70 is exposed. Next, the radar unit 70 is removed from the radar housing 50 and replaced by another radar unit 70. When doing so, since the radar unit 70 is detachably fixed to the radar housing 50 by the engagement parts 53, the radar unit 70 can be easily replaced by another radar unit 70.

Next, a procedure for attaching the radar cover 60 to the radar housing 50 after the radar unit 70 is replaced will be described.

After the radar unit 70 is replaced by another radar unit 70 as described above, firstly, the end 61 of the radar cover 60 on the outer side in the vehicle-width direction (see FIG. 4) is inserted into the opening formed at the end 54 of the radar housing 50 on the outer side in the vehicle-width direction. Next, as shown in FIG. 4, the flange part 63 provided at the end 62 of the radar cover 60 on the inner side in the vehicle-width direction is brought into tight contact with the flange part 56 provided at the end 55 of the radar housing 50 on the inner side in the vehicle-width direction. As a result, the radar cover 60 is positioned relative to the radar housing 50. This state is the state in which, as shown in FIG. 3, the end of the outer lens 30 (the lower end in FIG. 3) and the end of the radar cover 60 (the upper end in FIG. 3) are opposed to each other with the space S4 therebetween, and the second extension part 64 provided at the end of the radar cover 60 (the upper end in FIG. 3) is disposed behind the end (the first extension part 31) of the radar cover 60. Next, the flange part 63 provided at the end 62 of the radar cover 60 on the inner side in the vehicle-width direction is fixed to the flange part 56 provided at the end 55 of the radar housing 50 on the inner side in the vehicle-width direction by using the screw N. As a result, the radar cover 60 is detachably fixed to the radar housing 50.

The method for attaching and removing the radar cover 60 will be described in a more detailed manner with reference to FIG. 7.

Firstly, a method for removing the radar cover 60 from the radar housing 50 will be described.

Firstly, after the screw N is removed, the radar cover 60 is shifted, relative to the radar housing 50, to the inner side in the vehicle-width direction (to the right side in FIG. 4). By doing so, the end 61 of the radar cover 60 on the outer side in the vehicle-width direction is pulled out from the opening formed at the end 54 of the radar housing 50 on the outer side in the vehicle-width direction.

Figure 7A:
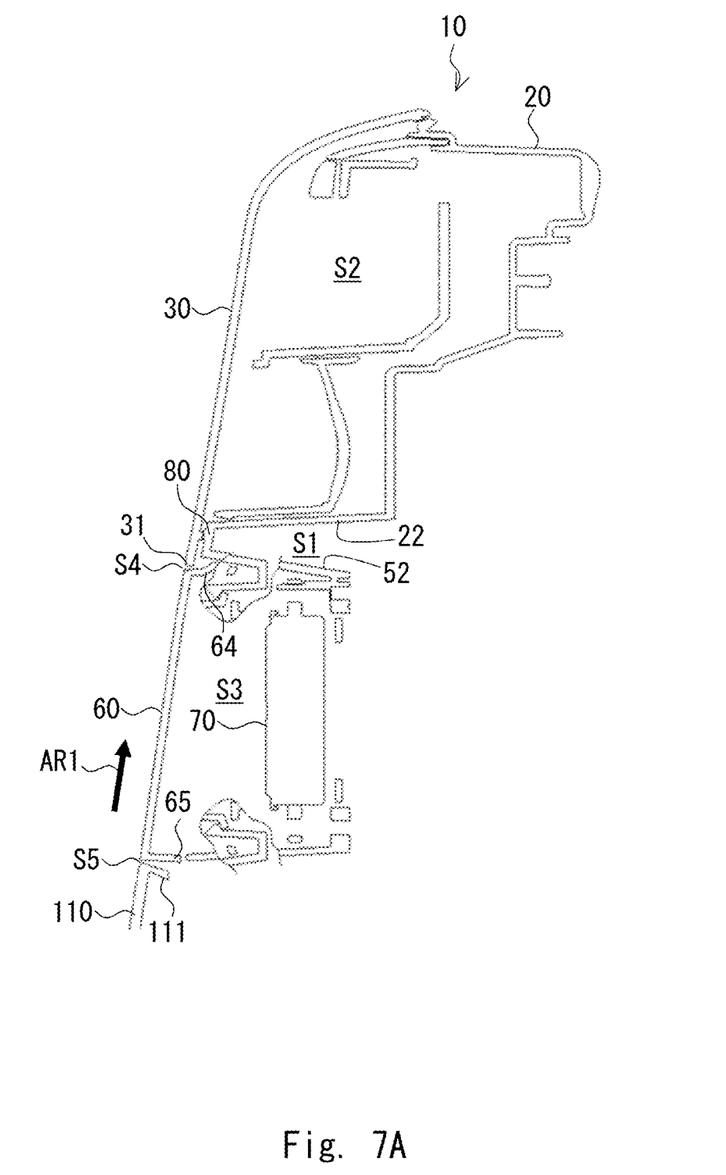
FIG. 7A shows a state in which a radar cover 60 is removed from a radar housing 50.

Next, the radar cover 60 is moved in a direction indicted by an arrow AR1 in FIG. 7A. By doing so, the second extension part 64 of the radar cover 60 is made to abut against (i.e., brought into contact with) the end of the outer lens 30 (the lower end in FIG. 7A).

Figure 7B:
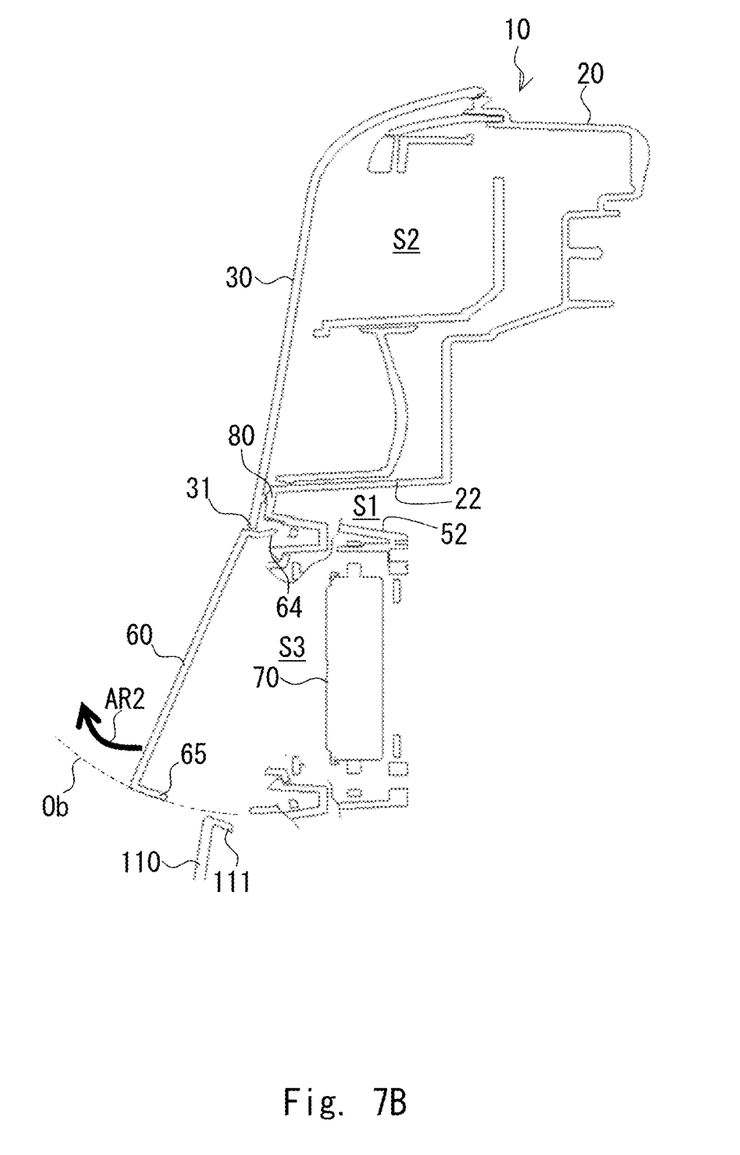
FIG. 7B shows a state in which the radar cover 60 is removed from the radar housing 50.
Figure 7C:
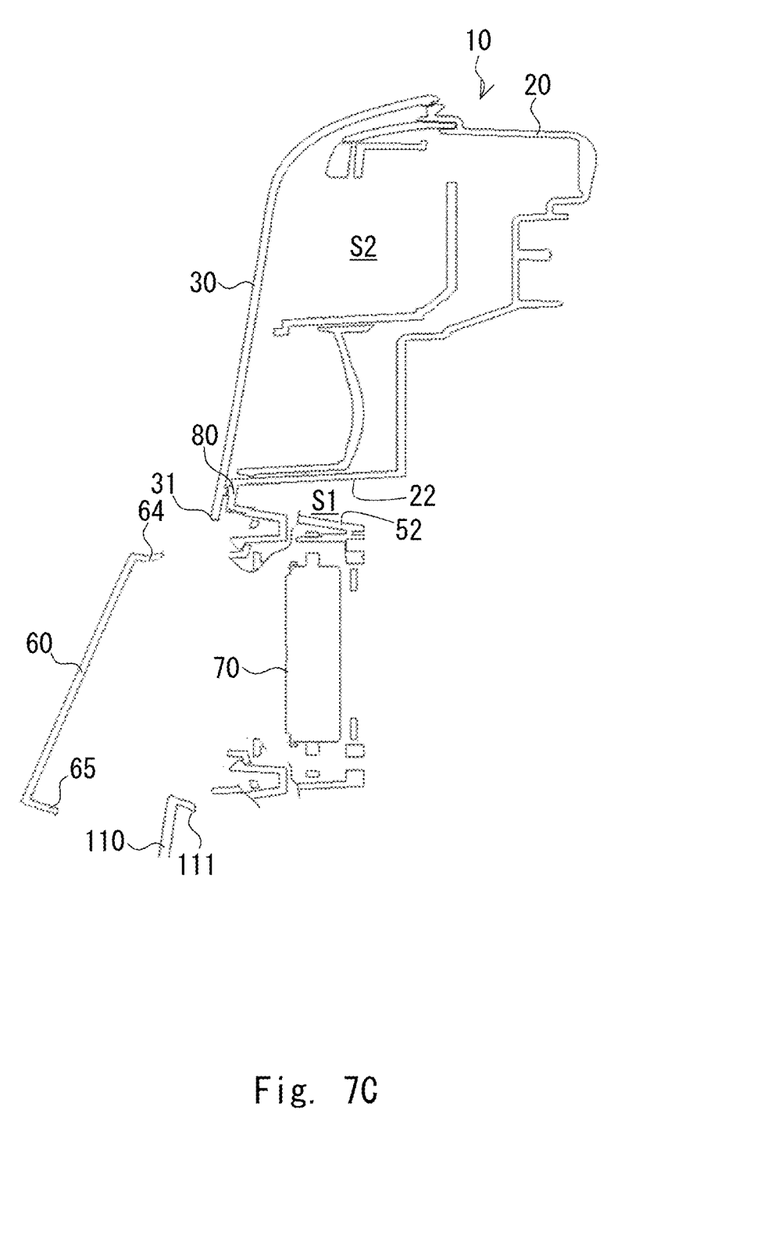
FIG. 7C shows a state in which the radar cover 60 is removed from the radar housing 50.

Next, the radar cover 60 is rotated around the point at which the second extension part 64 of the radar cover 60 abuts against (i.e., is in contact with) the end of the outer lens 30 (the lower end in FIG. 7A) in a direction indicated by an arrow AR2 in FIG. 7B. Through the above-described processes, the radar cover 60 can be removed from the radar housing 50 (see FIG. 7C). When doing so, since the end of the radar cover 60 (the lower end including the third extension part 65 in FIG. 7B) moves on a trajectory Ob indicated by a dashed line in FIG. 7B, the end of the radar cover 60 (the lower end including the third extension part 65 in FIG. 7B) does not interfere with (e.g., does not collide against) the bumper 110 (the fourth extension part 111). Further, since the second extension part 64 extends in an arc shape around the connecting part 80 (e.g., the center thereof), the state in which the second extension part 64 of the radar cover 60 abuts against (i.e., is in contact with) the end of the outer lens 30 (the lower end in FIG. 7B) can be maintained while the radar cover 60 is being rotated in the direction indicted by the arrow AR2 in FIG. 7B as described above. Next, a method for attaching the radar cover 60 to the radar housing 50 will be described. The radar cover 60 can be attached to the radar housing 50 by following (i.e., performing) the above-described procedure of the method for removing the radar cover 60 from the radar housing 50 in a reversed manner. That is, firstly, the second extension part 64 of the radar cover 60 is made to abut against (i.e., is brought into contact with) the end of the outer lens 30 (the lower end in FIG. 7B).

Next, the radar cover 60 is rotated around the point at which the second extension part 64 of the radar cover 60 abuts against (i.e., is in contact with) the end of the outer lens 30 (the lower end in FIG. 7B) in a direction opposite to the direction indicated by the arrow AR2 in FIG. 7B. When doing so, since the end of the radar cover 60 (the lower end including the third extension part 65 in FIG. 7B) moves on the trajectory Ob indicated by the dashed line in FIG. 7B, the end of the radar cover 60 (the lower end including the third extension part 65 in FIG. 7B) does not interfere with the bumper 110 (the fourth extension part 111). Further, since the second extension part 64 extends in an arc shape around the connecting part 80 (e.g., the center thereof), the state in which the second extension part 64 of the radar cover 60 abuts against (i.e., is in contact with) the end of the outer lens 30 (the lower end in FIG. 7B) can be maintained while the radar cover 60 is being rotated in the direction opposite to the direction indicted by the arrow AR2 in FIG. 7B as described above.

Next, the radar cover 60 is shifted, relative to the radar housing 50, to the outer side in the vehicle-width direction (to the left side in FIG. 4). By doing so, the end 61 of the radar cover 60 on the outer side in the vehicle-width direction is inserted into the opening formed at the end 54 of the radar housing 50 on the outer side in the vehicle-width direction. Next, the flange part 63 provided at the end 62 of the radar cover 60 on the inner side in the vehicle-width direction is fixed to the end of the radar housing 50 on the inner side in the vehicle-width direction by using the screw N. Through the above-described processes, the radar cover 60 can be attached to the radar housing 50. As described above, according to this embodiment, it is possible to prevent the distance between the radar unit 70 and the radar cover 60 from changing (and as a result, to prevent noises from occurring in electromagnetic waves (radar signals) that pass through the radar cover 60 and are transmitted to an area around the vehicle). In this way, it is possible to prevent the accuracy of the detection of an object present around the vehicle from deteriorating.

This is because the radar unit 70 and the radar cover 60 are fixed to one and the same radar housing 50. That is, this is because since the radar unit 70 and the radar cover 60 are fixed to the same radar housing 50, the radar unit 70 and the radar cover 60 vibrate in a unified manner (e.g., simultaneously vibrate in the same directions in the same manner as each other) when they vibrate due to vibrations of the vehicle (not shown) on which the vehicular lamp fitting 10 is mounted (e.g., due to vibrations thereof during the traveling), so that the distance between the radar unit 70 and the radar cover 60 does not change.

Further, according to this embodiment, there is another advantage that the effect of the heat (the heat generated by the lamp units 40A and 40B) on the radar unit 70 can be reduced. This is because the radar unit 70 is disposed in the second space S3 (formed by the radar housing 50 and the radar cover 60) in which the temperature is lower than that in the first space S2 (formed by the lamp housing 20 and the outer lens 30) where the temperature is raised due to the heat generated by the lamp units 40A and 40B. Further, according to this embodiment, since the side surface of the lamp housing 20 (the lower surface in FIG. 3) and the side surface of the radar housing 50 (the upper surface in FIG. 3) are opposed to each other with the space S1 therebetween, the heat in the lamp housing 20 is less likely to be transmitted to the radar unit 70, thus making it possible to further reduce the effect of the heat (the heat generated by the lamp units 40A and 40B) on the radar unit 70.

Further, according to this embodiment, there is another advantage that the radar unit 70 can be easily repaired or replaced in the event of failure thereof. This is because each of the radar unit 70 and the radar cover 60 is detachably fixed to the radar housing 50, so that the radar unit 70 can be replaced by removing the radar cover 60 from the radar housing 50 without removing the vehicular lamp fitting 10 itself from the vehicle (not shown).

Further, according to this embodiment, since the lamp housing 20, the radar housing 50, and the connecting part 80 are formed as an integrated component by injection molding, the radar housing 50 can be accurately positioned relative to the lamp housing 20 as compared to the case where the lamp housing 20 and the radar housing 50 are separately molded and then assembled into one assembly. Therefore, it is possible to reduce variations among the detection areas of radar units 70.

Further, according to this embodiment, since a bracket 100 (which will be described later) is not used, the number of components interposed between the vehicle and the radar unit 70 is reduced. Therefore, there are other advantages that the accuracy of the assembly is improved and the cost is reduced as compared to a modified example in which a bracket 100 is used (which will be described later).

Next, a modified example will be described.

Figure 6:
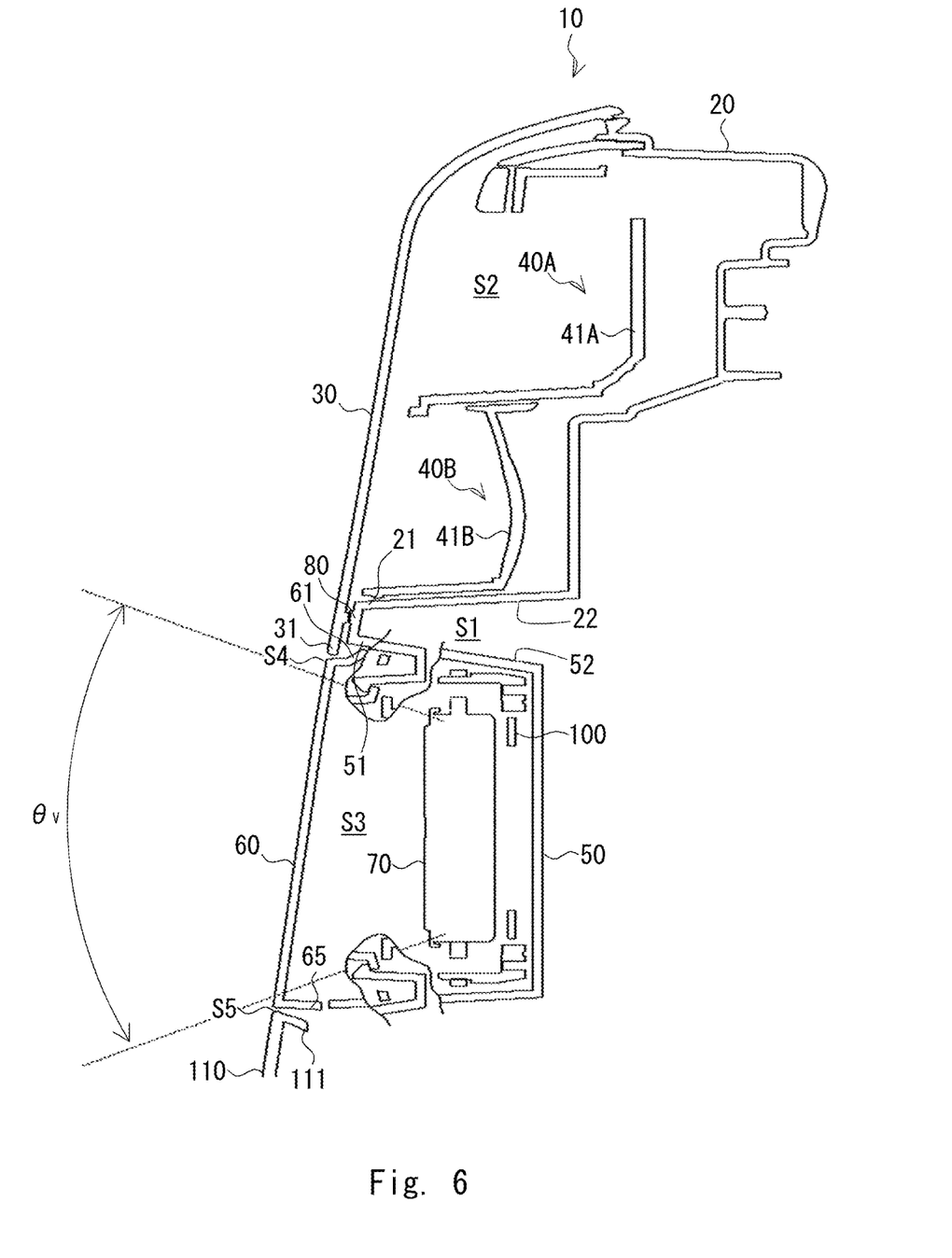
FIG. 6 is a modified example of a vehicular lamp fitting 10.

FIG. 6 shows a modified example of the vehicular lamp fitting 10.

The vehicular lamp fitting 10 according to this modified example corresponds to one that is obtained by adding a bracket 100 in the vehicular lamp fitting 10 shown in FIG. 3. The rest of the configuration is similar to that of the vehicular lamp fitting 10 shown in FIG. 3.

Although an example in which the radar unit 70 is fixed to the radar housing 50 by the engagement parts 53 provided in the radar housing 50 is described in the above-described embodiment, the present disclosure is not limited to this example.

For example, as shown in FIG. 6, the radar unit 70 may be fixed to the radar housing 50 by using an engagement part(s) 53 provided in the bracket 100 fixed to the radar housing 50.

According to this modified example, radar units having various shapes can be fixed to the radar housing 50 by replacing the bracket 100 by other brackets without changing the radar housing 50. Further, even in the case where the engagement part(s) 53 cannot be provided in the radar housing 50 because of the mold (i.e., dies) or the like, the radar unit 70 can be fixed to the radar housing 50 through the bracket 100.

Further, although an example in which the lamp housing 20 and the radar housing 50 are molded as an integrated component is described in the above-described embodiment, the present disclosure is not limited to this example. For example, the lamp housing 20 and the radar housing 50 may be separately molded, and then they may be assembled into one assembly.

Further, an example in which the radar housing 50 is disposed below the lamp housing 20 is described in the above-described embodiment, the present disclosure is not limited to this example. That is, the radar housing 50 may be disposed in various places such as above the lamp housing 20 or on the right or left side thereof.

Further, although an example in which a vehicular lamp fitting according to the present disclosure is applied to a rear combination lamp has been described in the above-described embodiment, the present disclosure is not limited to this example. For example, the present disclosure may be applied to a vehicle signal lighting fixture other than the rear combination lamp, and may also be applied to other vehicular lamp fittings such as a vehicle front light (e.g., a headlight). All the numeral values mentioned in the above-described embodiments are merely examples, and numeral values different from them can be uses as appropriate.

The above-described embodiments are merely examples in all the aspects thereof. The present disclosure should not be limited by the descriptions of the above-described embodiments. The present disclosure may be carried out in various other forms without departing from the spirit or main features of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicular lamp fitting comprising:
   a lamp housing;
   an outer lens attached to the lamp housing in a state of covering an opening of the lamp housing and forming a first space between the outer lens and the lamp housing;
   a lamp unit disposed in the first space;
   a radar housing;
   a radar cover attached to the radar housing in a state covering an opening of the radar housing and forming a second space between the radar cover and the radar housing;
   a radar unit disposed in the second space;
   a first fixing part fixing detachably the radar unit to the radar housing; and
   a second fixing part fixing detachably the radar cover to the radar housing.

2. The vehicular lamp fitting according to claim 1, wherein in the lamp housing and the radar housing, an opening of the lamp housing and an opening of the radar housing adjacent to each other are connected to each other by a connecting part.

3. The vehicular lamp fitting according to claim 2, wherein a side surface of the lamp housing and a side surface of the radar housing are opposed to each other with a space therebetween.

4. The vehicular lamp fitting according to claim 2, wherein the lamp housing, the radar housing, and the connecting part are formed as an integrated component by injection molding.

5. The vehicular lamp fitting according to claim 2, wherein the outer lens is welded to the opening of the lamp housing and the connecting part.

6. The vehicular lamp fitting according to claim 1, wherein the radar housing is disposed below the lamp housing.

7. The vehicular lamp fitting according to claim 1, wherein the first fixing part is provided in the radar housing.

8. The vehicular lamp fitting according to claim 1, further comprising a bracket fixed to the radar housing, wherein the first fixing part is provided in the bracket.

9. The vehicular lamp fitting according to claim 2, wherein
   an end of the outer lens and an end of the radar cover are opposed to each other,
   the end of the outer lens comprises a first extension part extending beyond the connecting part to a radar cover side, and
   the end of the radar cover comprises a second extension part extending from the end of the radar cover to an area behind the first extension part.

10. The vehicular lamp fitting according to claim 9, wherein the second extension part extends in an arc shape around the connecting part.

11. The vehicular lamp fitting according to claim 1, wherein
   the outer lens is transparent to visible light, and
   the radar cover is opaque to visible light.

12. The vehicular lamp fitting according to claim 9, wherein
   the vehicular lamp fitting which can be mounted on a vehicle to which a bumper is attached, and
   the radar cover is removed from the radar housing without causing the radar cover to interfere with the bumper by making the second extension part of the radar cover abut against the end of the outer lens and rotating the radar cover around a point at which the radar cover abuts against the end of the outer lens.

13. The vehicular lamp fitting according to claim 9, wherein
   the vehicular lamp fitting which can be mounted on a vehicle to which a bumper is attached, and
   the radar cover is attached to the radar housing without causing the radar cover to interfere with the bumper by making the second extension part of the radar cover abut against the end of the outer lens and rotating the radar cover around a point at which the radar cover abuts against the end of the outer lens.

14. The vehicular lamp fitting according to claim 12, wherein an end of the radar cover and an end of the bumper that are opposed to each other are formed in such a shape that a gap between these ends becomes wider toward a rear.

15. A method for removing a radar cover from a radar housing in a vehicular lamp fitting according to claim 9, comprising:
   making a second extension part of the radar cover abut against an end of the outer lens; and
   rotating the radar cover around a point at which the second extension part of the radar cover abuts against the end of the outer lens, and thereby removing the radar cover from the radar housing without causing the radar cover to interfere with a bumper.

16. A method for attaching a radar cover to a radar housing in a vehicular lamp fitting according to claim 9, comprising:
   making a second extension part of the radar cover abut against an end of the outer lens; and
   rotating the radar cover around a point at which the second extension part of the radar cover abuts against the end of the outer lens, and thereby attaching the radar cover from the radar housing without causing the radar cover to interfere with a bumper.

* * * * *